(12) United States Patent
Hung (10) Patent No.: US 11,035,518 B2
(45) Date of Patent: Jun. 15, 2021

(54) SUPPORT ARM APPARATUS

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD., Taichung (TH)

(*) Notice: Subject to any disclaimer, the term of this patent is extended or adjusted under 35 U.S.C. 154(b) by 5 days.

(21) Appl. No.: 16/526,950

(22) Filed: Jul. 30, 2019

(65) Prior Publication Data
US 2020/0063914 A1    Feb. 27, 2020

(30) Foreign Application Priority Data

Aug. 21, 2018   (TW) .................................. 107211464

(51) Int. Cl.
*F16M 13/00*  (2006.01)
*F16M 13/02*  (2006.01)
*F16C 7/06*   (2006.01)

(52) U.S. Cl.
CPC ............. *F16M 13/022* (2013.01); *F16C 7/06* (2013.01); *F16M 2200/06* (2013.01)

(58) Field of Classification Search
CPC ................................ F16M 11/10; F16M 11/06
USPC ..... 248/276.1, 284.1, 291.1, 292.11, 292.12, 248/292.13, 292.14, 917, 922, 923
See application file for complete search history.

(56) References Cited

U.S. PATENT DOCUMENTS

| | | | | |
|---|---|---|---|---|
| 5,743,503 A * | 4/1998 | Voeller | .................... | F16M 11/08 248/284.1 |
| 5,975,472 A * | 11/1999 | Hung | .................... | F16M 11/105 248/278.1 |
| 6,012,693 A * | 1/2000 | Voeller | ................. | F16M 11/048 248/279.1 |
| 8,366,060 B2 * | 2/2013 | Hung | .................... | F16M 11/041 248/124.1 |
| 10,760,731 B2 * | 9/2020 | Chang | ........................ | F16F 9/54 |
| 2008/0029670 A1 * | 2/2008 | Hung | .................... | F16M 11/041 248/278.1 |
| 2012/0235000 A1 * | 9/2012 | Borloz | ................. | F16M 11/046 248/284.1 |
| 2018/0372268 A1 | 12/2018 | Hung | | |

FOREIGN PATENT DOCUMENTS

TW            M548619           9/2017

* cited by examiner

*Primary Examiner* — Steven M Marsh
(74) *Attorney, Agent, or Firm* — DLA Piper LP (US)

(57) ABSTRACT

A support arm apparatus includes an arm device, a joint device, an extension and retraction device, and an adjustment device. The joint device includes first and second joint seats, and the first joint seat has a receiving space. The extension and retraction device includes a fixed portion and a moving portion that is connected to the fixed portion and that is movable relative to the fixed portion. The adjustment device includes a track seat, a linking seat, and a threaded member. The track seat is inserted fixedly into the receiving space and includes two track walls. The threaded member abuts against support portions of the track walls, and is threadedly engaged with the linking seat.

6 Claims, 9 Drawing Sheets

SUPPORT ARM APPARATUS

CROSS-REFERENCE TO RELATED APPLICATION

This application claims priority of Taiwanese Patent Application No. 107211464, filed on Aug. 21, 2018.

FIELD

The disclosure relates to a support arm apparatus, more particularly to an adjustable support arm apparatus for suspending an object.

BACKGROUND

Figure 1:
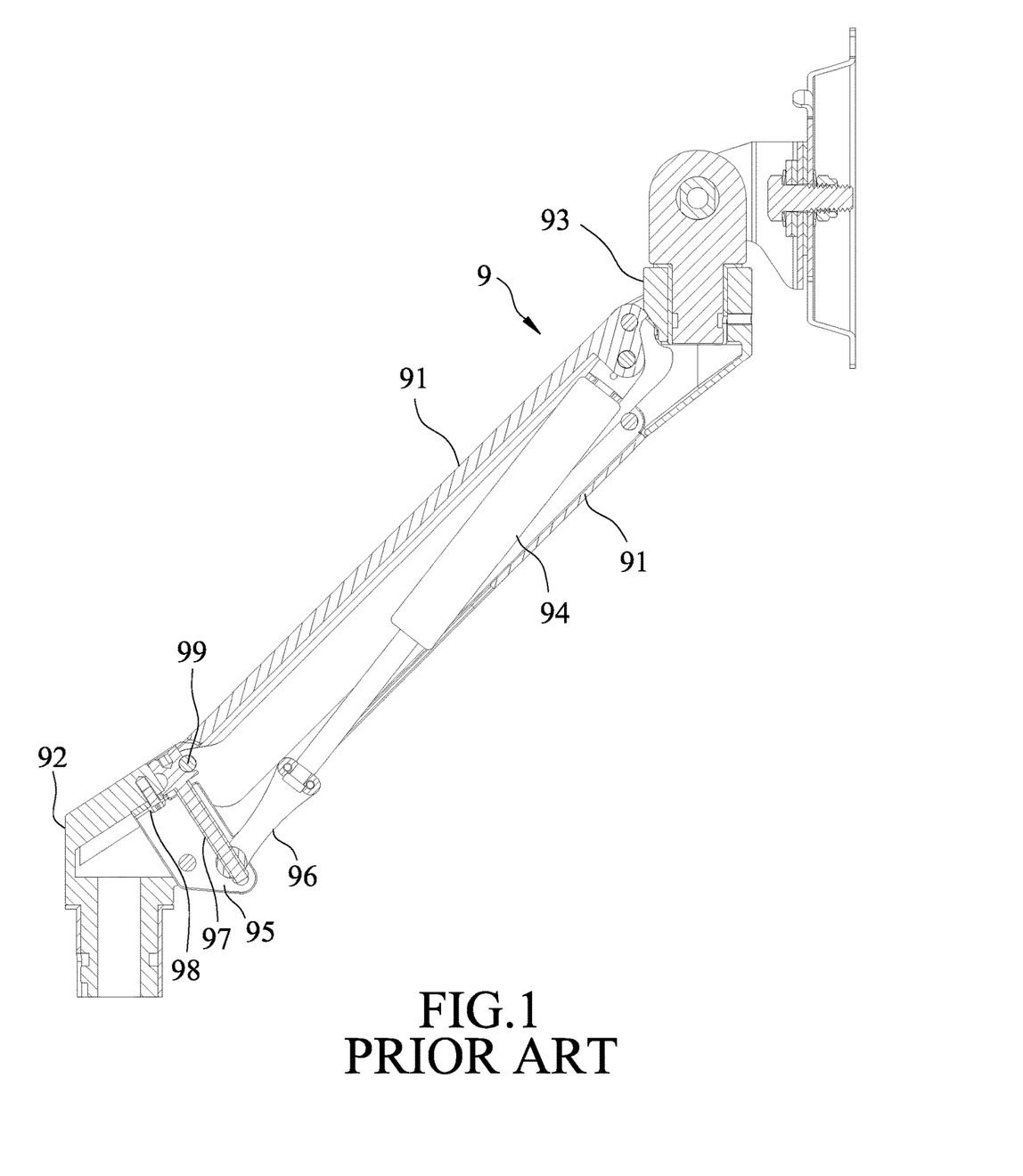
FIG. 1 is a sectional view of a conventional support arm apparatus.
Figure 2:
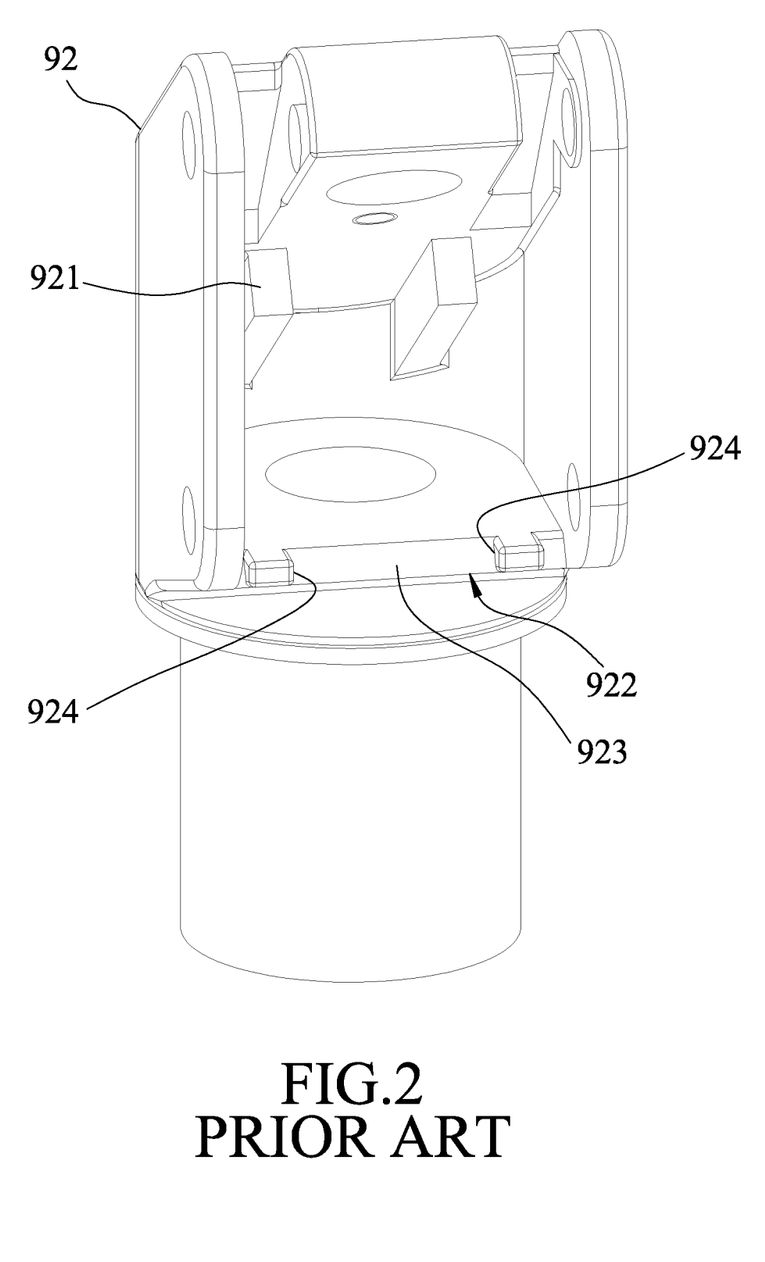
FIG. 2 is a perspective view of an endcap member of the conventional support arm apparatus.

Referring to FIGS. 1 and 2, in a conventional support arm device 9 illustrated in Taiwanese Utility Model Patent No. M548619, in order to adjust a load range thereof, an adjusting threaded shaft 97 is rotated. The rotation of the adjusting threaded shaft 97 drives a connecting member 96 to move, thereby extending or retracting an extension and retraction member 94 so as to adjust the load range thereof.

To install a guiding member 95 to an endcap member 92, first, the guiding member 95 is inserted into the endcap member 92. Then, a screw fastener 98 is disposed in the guiding member 95 and inserted through the guiding member 95 and the endcap member 92 to secure the guiding member 95 to the endcap member 92. Because the insertion direction of the screw fastener 98 is at an angle to the direction along which the guiding member 95 is inserted into the endcap member 92, an opening of the guiding member 95 for a tool to access the screw fastener 98 may be limited by the endcap member 92, thereby adversely affecting engagement of a tool with the screw fastener 98.

Furthermore, even though the adjusting threaded shaft 97 extends through the endcap member 92, it is only supported by an upper pivot pin 99 on one side, and thus may be noisy and unstable when operated.

Moreover, in order to secure the guiding member 95, the endcap member 92 must be formed with two retaining protrusions 921, a retaining slot 922, a retaining surface 923, two limiting surface 924, etc, which makes the structure of the endcap member 92 complicated and difficult to be manufactured via a molding process.

SUMMARY

Therefore, the object of the disclosure is to provide a support arm apparatus that can alleviate at least one of the drawbacks of the prior art.

According to the disclosure, a support arm apparatus includes an arm device, a joint device, an extension and retraction device, and an adjustment device.

The arm device includes a first arm and a second arm that cooperates with the first arm to define an elongated passage.

The joint device includes first and second joint seats that are respectively and pivotally connected to two end portions of the first arm, that are respectively and pivotally connected to two end portions of the second arm, and that cooperate with the first and second arms to form a four-bar linkage. The first joint seat has a receiving space.

The extension and retraction device is disposed in the passage of the arm device and includes a fixed portion that is pivotally connected to the first arm, and a moving portion that is connected to the fixed portion and that is movable relative to the fixed portion along the passage.

The adjustment device includes a track seat, a linking seat, and a threaded member. The track seat is inserted fixedly into the receiving space and includes two spaced-apart track walls. Each of the track walls has a support portion. The support portions of the track walls are spaced apart from each other and define a gap therebetween. The linking seat is movably connected to the track seat. The moving portion of the extension and retraction device is co-movably connected to the linking seat. The threaded member has a head portion abutting against the support portions of the track walls, and a threaded portion extending through the gap between the support portions of the track walls. The threaded portion is threadedly engaged with the linking seat such that rotation of the threaded member drives movement of the linking seat along the threaded portion of the threaded member and simultaneously drives movement of the moving portion relative to the fixed portion of the extension and retraction device along the passage.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 3:
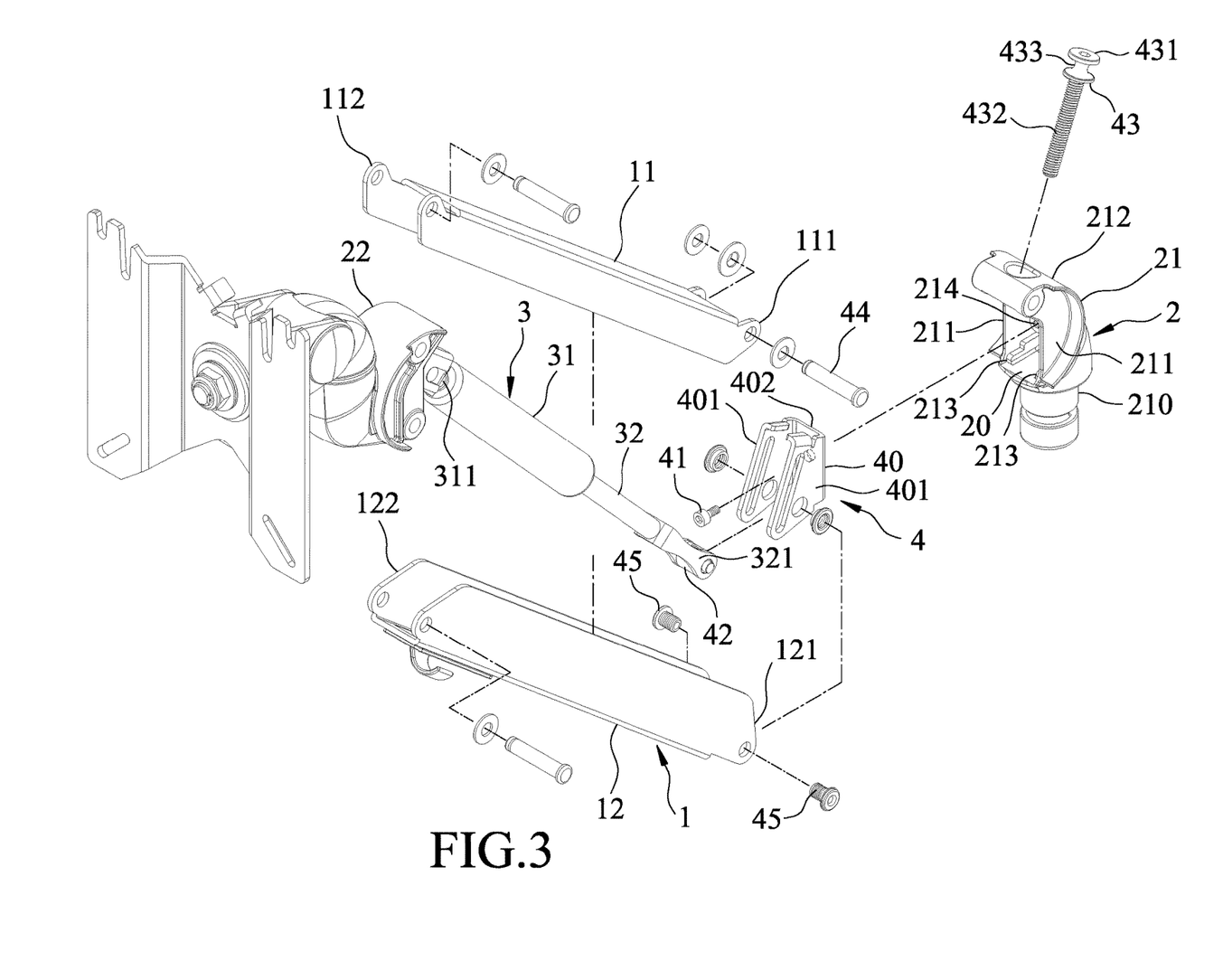
FIG. 3 is an exploded perspective view of an embodiment of a support arm apparatus according to the disclosure.
Figure 4:
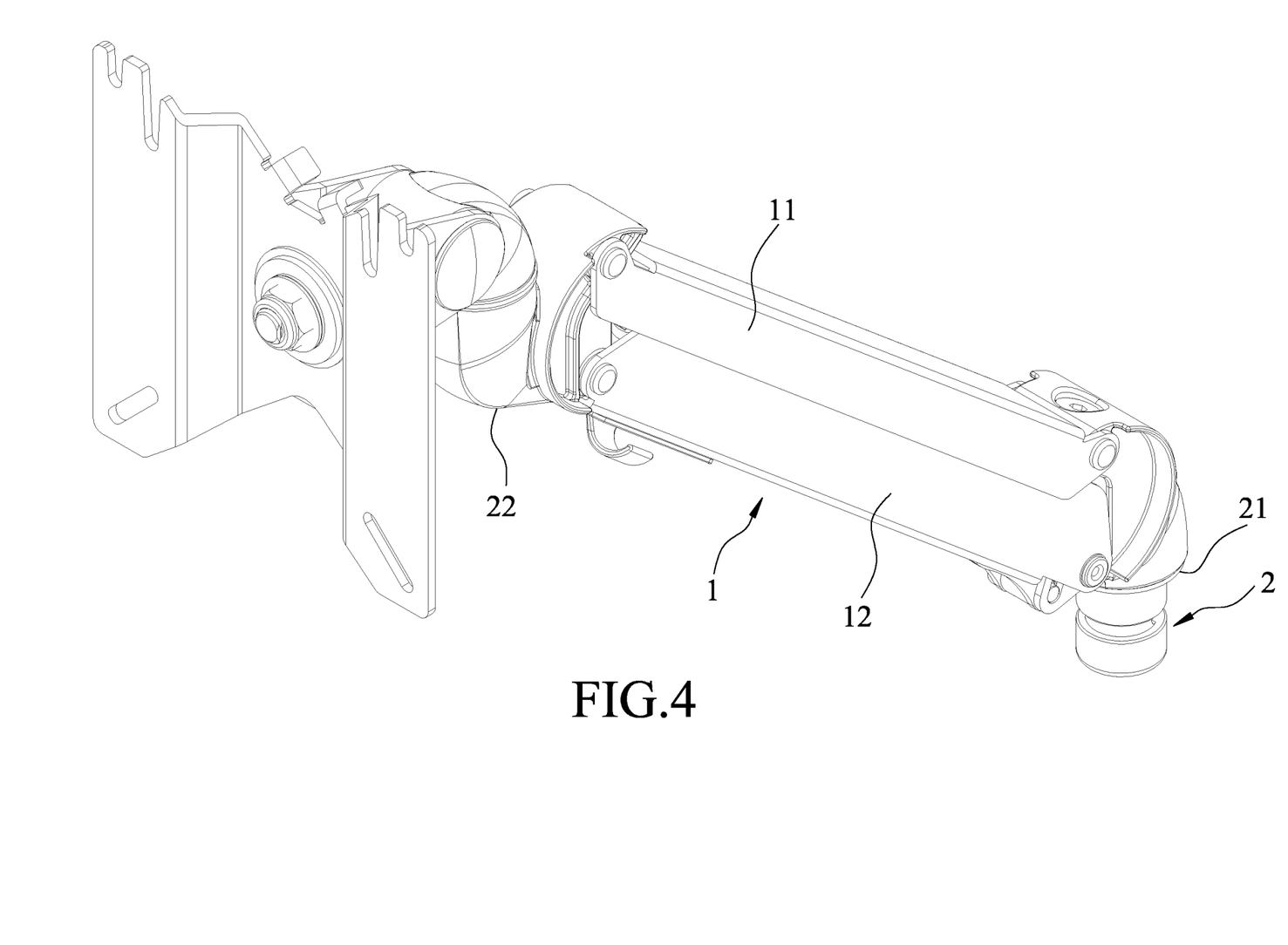
FIG. 4 is an assembled perspective view of the embodiment.
Figure 5:
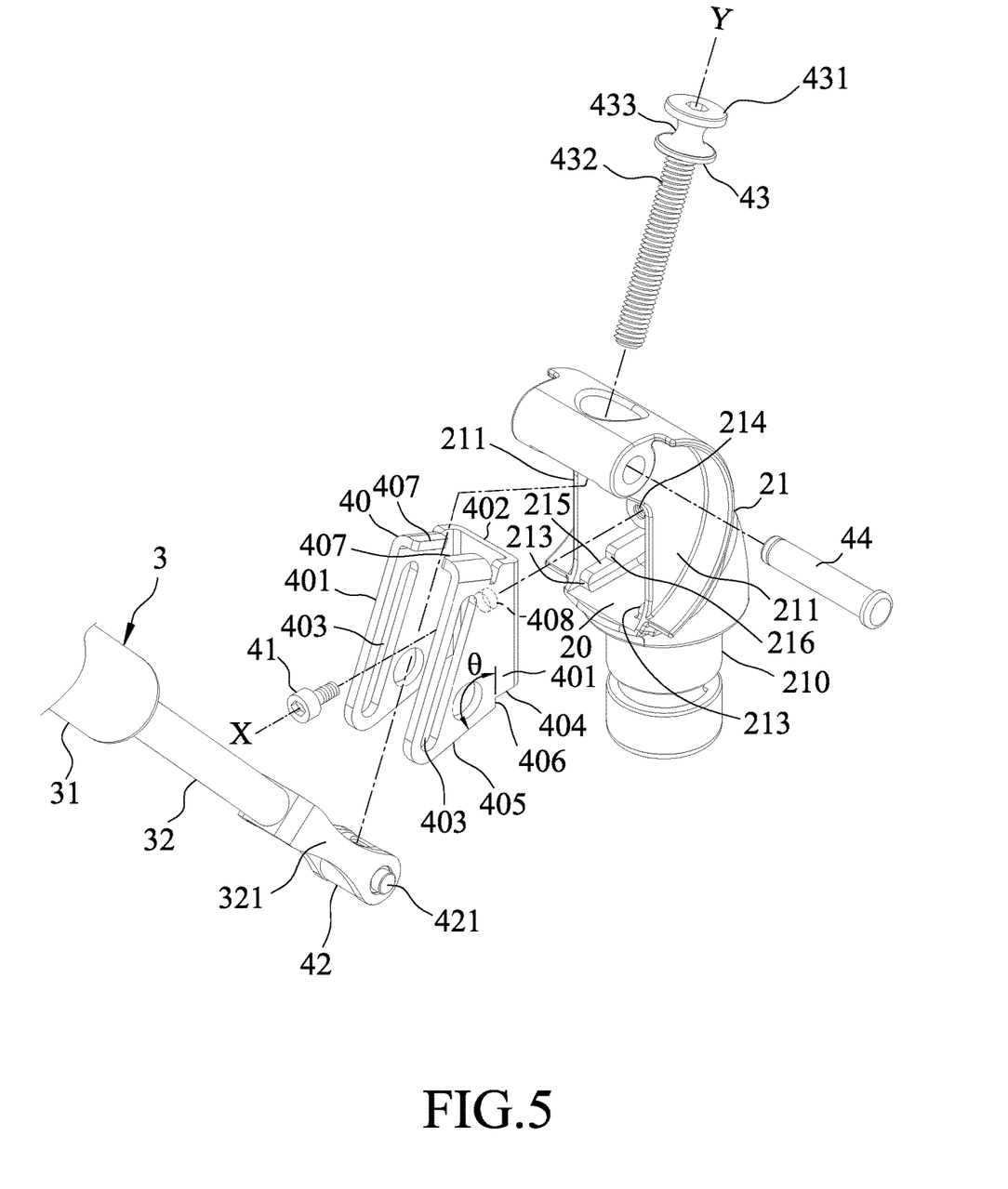
FIG. 5 is a fragmentary exploded perspective view of the embodiment, illustrating a track seat of the embodiment insertable along a securing axis into a first joint seat of the embodiment.

Referring to FIGS. 3 to 5, an embodiment of a support arm apparatus according to the present disclosure includes an arm device 1, a joint device 2, an extension and retraction device 3, and an adjustment device 4.

Figure 7:
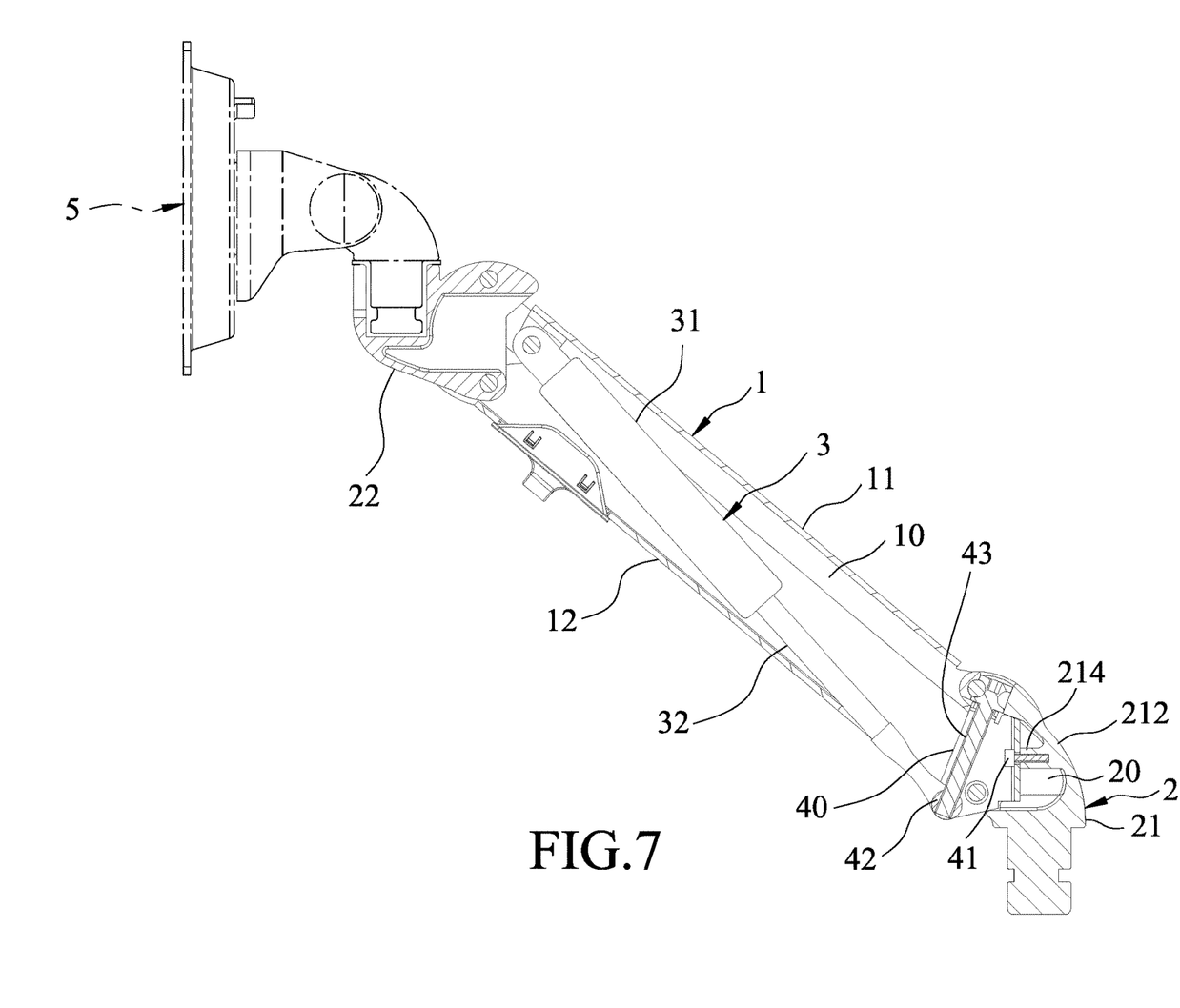
FIG. 7 is a sectional view of the embodiment with an object.

The arm device 1 includes a first arm 11 and a second arm 12 that cooperates with the first arm 11 to define an elongated passage 10 (see FIG. 7). The first arm 11 has opposite first and second end portions 111, 112. The second arm 12 has opposite first and second end portions 121, 122.

The joint device 2 includes first and second joint seats 21, 22 that are respectively and pivotally connected to the first and second end portions 111, 112 of the first arm 11, that are respectively and pivotally connected to the first and second end portions 121, 122 of the second arm 12, and that cooperate with the first and second arms 11, 12 to form a four-bar linkage.

The first joint seat 21 includes a seat base 210, two spaced-apart side walls 211 that are connected to the seat base 210, a back wall 212, and two stop portions 213. The back wall 212 is connected to the side walls 211, and cooperates with the seat base 210 and the side walls 211 to define a receiving space 20. The back wall 212 has an engaging stud 214 extending into the receiving space 20 along a securing axis (X). In this embodiment, each of the stop portions 213 is formed between the seat base 210 and a respective one of the side walls 211, and has a stepped structure. Specifically, each of the stop portions 213 has a contact surface 215 elevated from the seat base 210, and a stop surface 216 being perpendicular to the contact surface 215.

The extension and retraction device 3 is disposed in the passage 10 of the arm device 1 (see FIG. 7), and includes a fixed portion 311 that is pivotally connected to the first arm 11, and a moving portion 321 that is connected to the fixed portion 311 and that is movable relative to the fixed portion 311. In this embodiment, the extension and retraction device 3 includes a cylinder 31 that has an end portion serving as the fixed portion 311 of the extension and retraction device 3, and a piston rod 32 that is connected telescopically to the cylinder 31 and that has an end serving as the moving portion 321 of the extension and retraction device 3.

Figure 6:
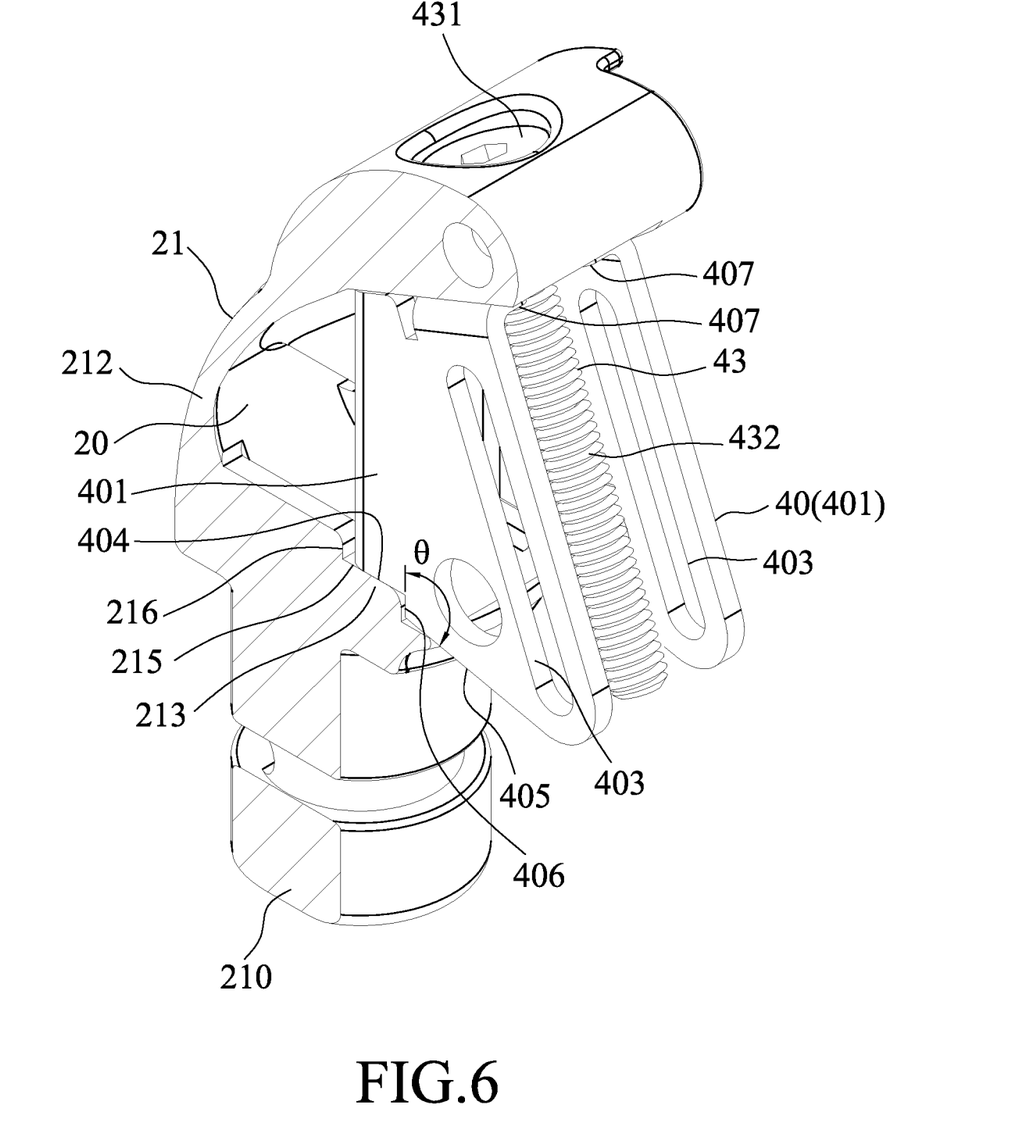
FIG. 6 is a perspective partly cutaway view of the embodiment, illustrating the track seat that is inserted into the first joint seat.

Referring to FIGS. 3, 5, and 6, the adjustment device 4 includes a track seat 40, a securing member 41, a linking seat 42, a threaded member 43, a pivot shaft 44, and two pivot members 45.

The track seat 40 has an open end portion disposed outside of the first joint seat 21, and an opposite end portion extending along the securing axis (X) and inserted fixedly into the receiving space 20. The track seat 40 includes two spaced-apart track walls 401, and a connecting wall 402 that interconnects the track walls 401.

The track walls 401 respectively abut against the stop portions 213 of the first joint seat 21. Each of the track walls 401 has a slide slot 403, an abutting surface 404, an extending surface 405, a limiting surface 406 interconnecting the abutting surface 404 and the extending surface 405, and a support portion 407. The slide slot 403 has two ends respectively proximal to the first arm 11 and the second arm 12. The support portions 407 of the track walls 401 are spaced apart from each other and define a gap therebetween. The abutting surface 404 abuts against the contact surface 215 of a respective one of the stop portions 213. The extending surface 405 and the limiting surface 406 forms a stepped configuration that corresponds in shape to the stop portions 213 of the first joint seat 21. The extending surface 405 and the limiting surface 406 cooperatively define an angle (θ) therebetween, the angle (θ) being larger than 90 °.

The connecting wall 402 of the track seat 40 is formed with a through hole 408 and abuts against the stop surfaces 216 of the stop portions 213 of the first joint seat 21.

In this embodiment, the securing member 41 is a screw, extends along the securing axis (X) through the through hole 408, and engages with the engaging stud 214 of the back wall 212 of the first joint seat 21 for securing the track seat 40 to the first joint seat 21.

The linking seat 42 is connected to the track seat 40, has two protruding portions 421 (only one visible) engaging respectively the tracks 403 of the track walls 401, and is movable relative to the track seat 40 between an top position (FIG. 9), where the linking seat 42 is proximal to the first arm 11, and a bottom position (FIG. 8), where the linking seat 42 is proximal to the second arm 12. The moving portion 321 of the extension and retraction device 3 is co-movably connected to the linking seat 42.

The threaded member 43 extends rotatably along an adjusting axis (Y) through the first joint seat 21 and has a head portion 431 abutting against the support portions 407 of the track walls 401, and a threaded portion 432 extending along the adjusting axis (Y) and through the gap between the support portions 407 of the track walls 401. The threaded portion 432 is threadedly engaged with the linking seat 42 such that rotation of the threaded member 43 drives movement of the linking seat 42 along the threaded portion 432 of the threaded member 43 via movement of the protruding portions 421 along the sliding slots 403 of the track seat 40, and simultaneously drives movement of the moving portion 321 relative to the fixed portion 311 of the extension and retraction device 3 along the passage 10.

The head portion 431 of the threaded member 43 is formed with an annular groove 433. The pivot shaft 44 extends through the first end portion 111 of the first arm 11, interconnects the first arm 11 and the first joint seat 21, and engages the groove 433 such that the threaded member 43 is rotatable about the adjusting axis (Y) and unmovable along the adjusting axis (Y). The pivot members 45 extend through the first end portion 121 of the second arm 12 and the track seat 40 to interconnect the second arm 12 and the first joint seat 21.

To insert the track seat 40 into the receiving space 20 of the first joint seat 21, one only needs to push the track seat 40 towards the first joint seat 21 along the securing axis (X) until the connecting wall 402 abuts against the stop surfaces 216 of the stop portions 213 and the engaging stud 214 of the first joint seat 21. Then the securing member 41 is inserted through the through hole 408, along the securing axis (X) also, and engaged with the engaging stud 214 to secure the track seat 40 to the first joint seat 21.

Figure 8:
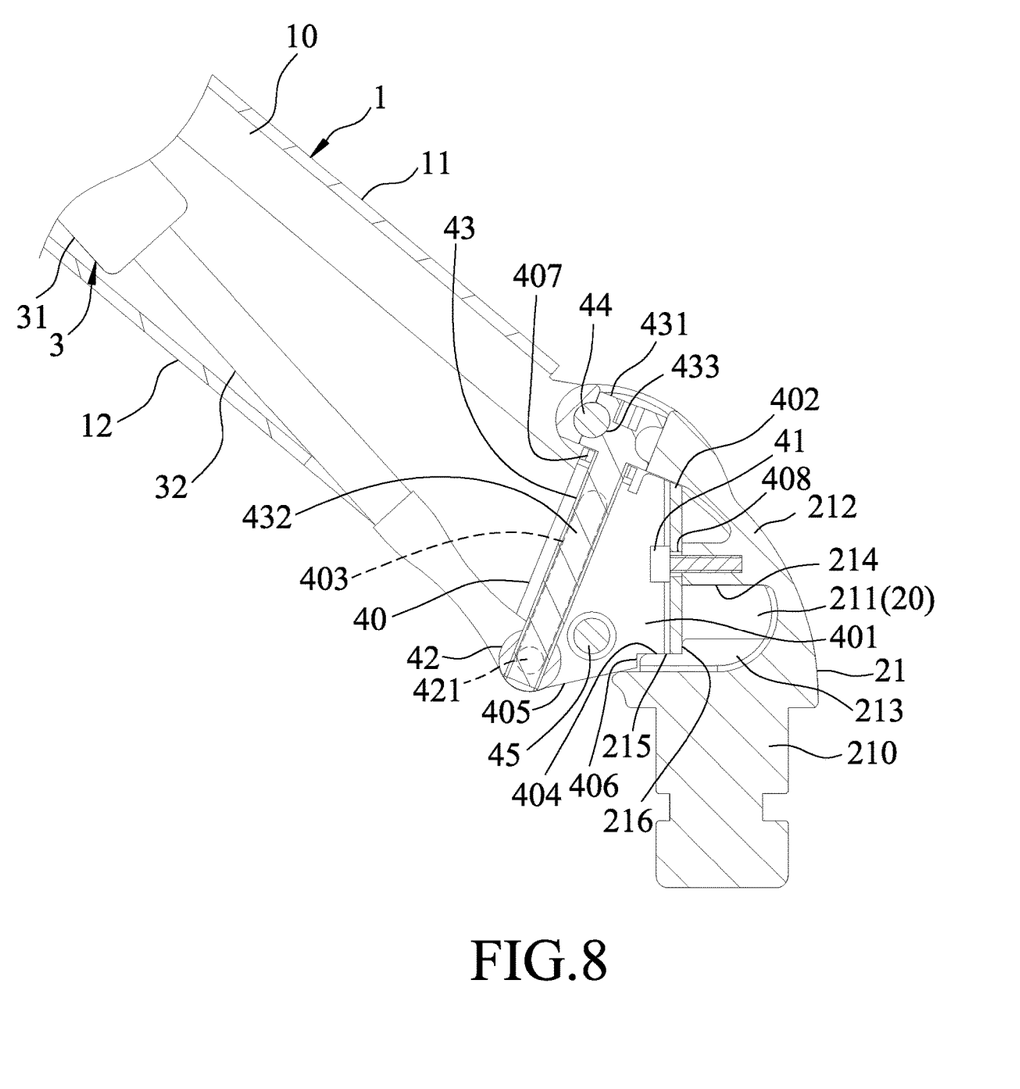
FIG. 8 is a fragmentary sectional view of the embodiment, illustrating a linking seat of the embodiment in a bottom position.
Figure 9:
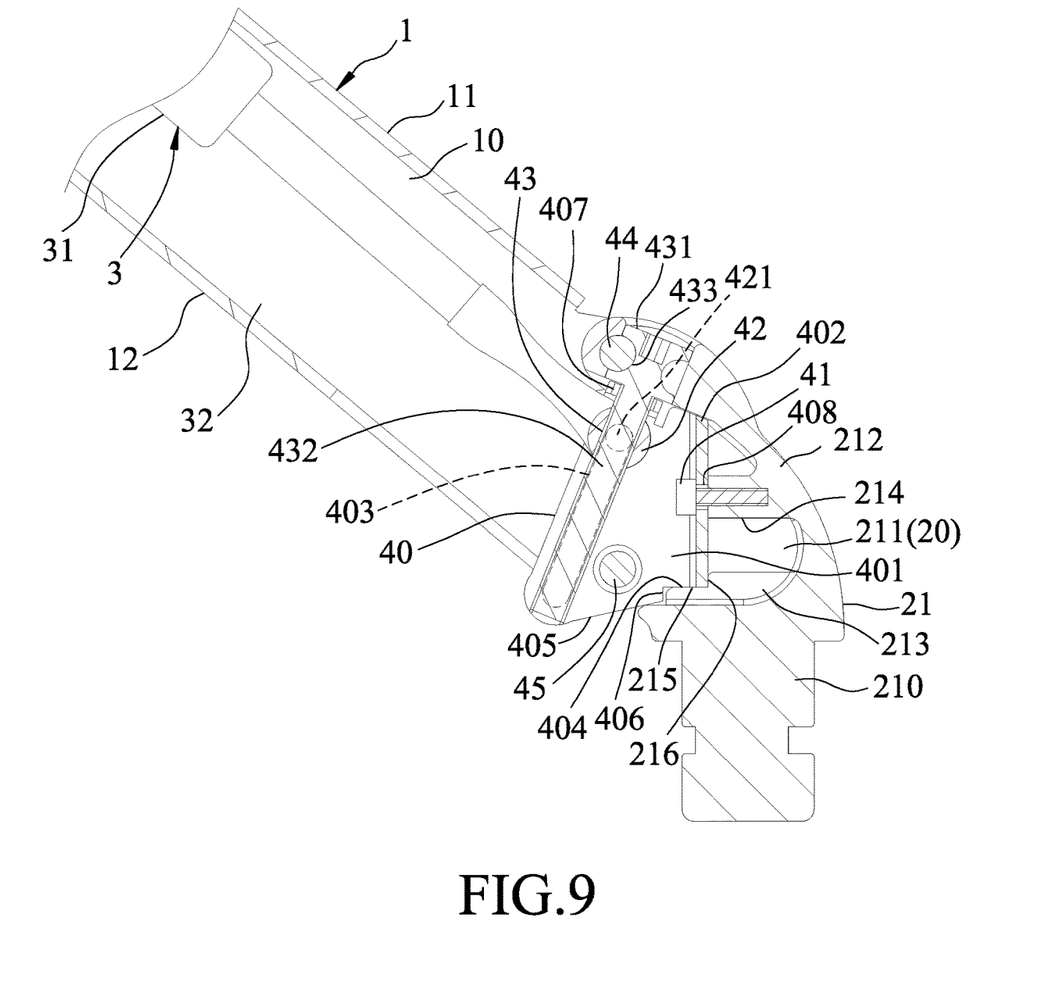
FIG. 9 is a view similar to FIG. 8, but illustrating the linking seat in an top position.

Referring to FIGS. 7 to 9, the support arm apparatus according to the disclosure is adapted for suspending an object 5 (e.g. a display). To change the load range of the support arm apparatus, the threaded member 43 is rotated to drive movement of the linking seat 42 along the threaded portion 432. Through engagement between the protruding portions 421 and the slide slots 403, the linking seat 42 is guided between the top position and the bottom position. When the linking seat 42 is at the bottom position as shown in FIG. 8, the piston rod 32 is pulled, extending the length of extension and retraction device 3, and when the linkage seat 42 is at the top position as shown in FIG. 9, the piston rod 32 is pushed into the cylinder 31, changing the pressure inside the cylinder 31 to adjust the load range. Details of the adjustment of the load range is disclosed in the prior art and well known to a person of ordinary skills in the art, and thus would not be further discussed here.

From the above description, the benefits of the embodiment may be summarized as follows:

1. Since both the track seat 40 and the securing member 41 are inserted into the receiving space 20 along the securing axis (X), without other elements blocking an opening of the receiving space 20, the securing member 41 may be easily inserted through the through hole 408 and engaged with the engaging stud 214 of the first joint seat 21.

2. The head portion 431 of the threaded member 43 abuts against the supporting portions 407 of the track walls 401, which helps to stabilize the threaded member 43 during rotation, reducing shaking and possible noise resulting from the shaking.

3. The engaging stud 214 and the stop portion 213 both extend along the securing axis (X), simplifying the structure of the joint seat 21 and allowing for easier manufacture thereof.

4. Since the angle (θ) defined by the extending surface 405 and the limiting surface 406 of the track seat 40 is larger than 90°, the slide slots 403 can be longer than if the extending surface 405 was horizontal, which provides a larger range of movement for the linking seat 42 and thus a larger range of extension and retraction of the extension and retraction device 3.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A support arm apparatus comprising:
    an arm device including a first arm and a second arm that cooperates with said first arm to define an elongated passage;
    a joint device including first and second joint seats that are respectively and pivotally connected to two end portions of said first arm, that are respectively and pivotally connected to two end portions of said second arm, and that cooperate with said first and second arms to form a four-bar linkage, said first joint seat having a receiving space;
    an extension and retraction device disposed in said passage of said arm device, and including a fixed portion that is pivotally connected to said first arm, and a moving portion that is connected to said fixed portion and that is movable relative to said fixed portion along said passage; and
    an adjustment device including
        a track seat that is inserted fixedly into said receiving space and that includes two spaced-apart track walls, each of said track walls having a support portion, said support portions of said track walls being spaced apart from each other and defining a gap therebetween,
        a linking seat that is movably connected to said track seat, said moving portion of said extension and retraction device being co-movably connected to said linking seat, and
        a threaded member that has a head portion abutting against said support portions of said track walls, and a threaded portion extending through said gap between said support portions of said track walls and threadedly engaged with said linking seat, such that rotation of said threaded member drives movement of said linking seat along said threaded portion of said threaded member and simultaneously drives movement of said moving portion relative to said fixed portion of said extension and retraction device along said passage.

2. The support arm apparatus as claimed in claim 1, wherein:
    said first joint seat includes
        a seat base,
        two spaced-apart side walls that are connected to said seat base,
        a back wall that is connected to said side walls, and that cooperates with said seat base and said side walls to define said receiving space, and
        two stop portions, each of said stop portions being formed between said seat base and a respective one of said side walls; and
    said track walls of said track seat respectively abut against said stop portions of said first joint seat.

3. The adjustable support apparatus as claimed in claim 2, wherein:
    said track seat has an open end portion disposed outside of said first joint seat, and an opposite end portion extending along a securing axis and inserted fixedly into said receiving space;
    said back wall of said first joint seat has an engaging stud extending into said receiving space and abutting against said track seat;
    said track seat further includes a connecting wall interconnecting said track walls and formed with a through hole; and
    said adjustment device further includes a securing member that extends along the securing axis through said through hole and that engages with said engaging stud of said back wall of said first joint seat for securing said track seat to said first joint seat.

4. The support arm apparatus as claimed in claim 3, wherein:
    each of said stop portions of said first joint seat has a contact surface elevated from said seat base, and a stop surface being perpendicular to said contact surface;
    each of said track walls of said track seat has an abutting surface abutting against said contact surface of a respective one of said stop portions; and
    said connecting wall of said track seat abuts against said blocking surfaces of said stop portions of said first joint seat.

5. The support arm apparatus as claimed in claim 1, wherein:
    said threaded portion of said threaded member extends along an adjusting axis;
    said threaded member is formed with a groove; and
    said adjustment device further includes two pivot members interconnecting said second arm and said second joint seat, and a pivot shaft interconnecting said first arm and said first joint seat, and engaging said groove such that said threaded member is rotatable about the adjusting axis and unmovable along the adjusting axis.

6. The support arm apparatus as claimed in claim 1, wherein said extension and retraction device includes a cylinder that has an end portion serving as said fixed portion of said extension and retraction device, and a piston rod that is connected telescopically to said cylinder and that has an end serving as said moving portion of said extension and retraction device.

\* \* \* \* \*